(12) United States Patent
Cavanaugh et al.

(10) Patent No.: US 7,221,429 B1
(45) Date of Patent: May 22, 2007

(54) WAVELENGTH LOCKER WITH LIQUID CRYSTAL TUNABLE FILTER GENERATING TRANSMITTED AND REFLECTED OUTPUTS

(75) Inventors: Shanti A. Cavanaugh, Santa Rosa, CA (US); James M. Hood, Petaluma, CA (US); Louis J. Molinari, Windsor, CA (US)

(73) Assignee: Xtellus Inc., Morris Plains, NJ (US)

( * ) Notice: Subject to any disclaimer, the term of this patent is extended or adjusted under 35 U.S.C. 154(b) by 217 days.

(21) Appl. No.: 10/719,078

(22) Filed: Nov. 21, 2003

Related U.S. Application Data

(63) Continuation of application No. 10/453,455, filed on Jun. 2, 2003, now Pat. No. 7,009,680.

(51) Int. Cl.
 *G02F 1/13* (2006.01)
(52) U.S. Cl. ............... 349/198; 372/29.01; 372/29.011
(58) Field of Classification Search ............... 349/198; 372/29.011
See application file for complete search history.

(56) References Cited

U.S. PATENT DOCUMENTS

| 4,135,789 A | 1/1979 | Hall |
|---|---|---|
| 4,148,128 A | 4/1979 | Feldman |
| 4,165,157 A | 8/1979 | Kobale |
| 4,310,220 A | 1/1982 | Kuwagaki |
| 4,315,668 A | 2/1982 | Aftergut |
| 4,410,238 A | 10/1983 | Hanson |
| 4,545,650 A | 10/1985 | Kirkman |
| 4,556,289 A | 12/1985 | Fergason |
| 4,634,225 A | 1/1987 | Haim |
| 5,013,140 A | 5/1991 | Healey |
| 5,015,057 A | 5/1991 | Rumbaugh |
| 5,088,806 A | 2/1992 | McCartney |
| 5,150,236 A * | 9/1992 | Patel .................. 349/198 |
| 5,276,747 A | 1/1994 | Pan |
| 5,414,541 A | 5/1995 | Patel |
| 5,430,561 A | 7/1995 | Kato |
| 5,528,402 A | 6/1996 | Parker |
| 5,724,165 A | 3/1998 | Wu |
| 5,726,805 A | 3/1998 | Kauskik |
| 5,727,109 A | 3/1998 | Pan |
| 5,859,728 A | 1/1999 | Colin |
| 5,877,876 A | 3/1999 | Birdwell |

(Continued)

*Primary Examiner*—Andrew Schechter
*Assistant Examiner*—Phu Vu
(74) *Attorney, Agent, or Firm*—Morrison & Foerster LLP

(57) ABSTRACT

A wavelength locker operates with a reference tunable liquid crystal filter having integrated photodetectors deposited on the front and backside of the liquid crystal cell to track power intensity of the accepted passband signal and its rejected signal compliment at a 50% power point where the two signals cross on the side of the filter transmission peak. The tunable filter is tuned by an offset wavelength from the laser wavelength such that 50% power is transmitted through the filter at the center wavelength of the laser. The wavelength locker may be configured with a liquid crystal tunable etalon or a liquid crystal tunable bandpass filter. A method for locking an optical signal to a desired frequency is also included and provides a substantially linear feedback signal computed by dividing the rejected signal power by the accepted signal power and passing it to laser transmitter to enable it to correct for frequency drift. Optional features of the present invention include an integrated thermal sensor and heater and temperature compensation control schemes.

20 Claims, 17 Drawing Sheets

U.S. PATENT DOCUMENTS

| | | |
|---|---|---|
| 5,953,087 A | 9/1999 | Hoyt |
| 5,963,291 A | 10/1999 | Wu |
| 6,075,512 A | 6/2000 | Patel |
| 6,094,246 A | 7/2000 | Wong |
| 6,104,466 A * | 8/2000 | Buchwalter et al. ........ 349/187 |
| 6,141,076 A | 10/2000 | Liu |
| 6,141,361 A | 10/2000 | Mears |
| 6,166,838 A | 12/2000 | Liu |
| 6,181,846 B1 | 1/2001 | Pan |
| 6,201,593 B1 | 3/2001 | Wong |
| 6,215,928 B1 | 4/2001 | Friesem |
| 6,253,015 B1 | 6/2001 | Ukrainczyk |
| 6,285,478 B1 | 9/2001 | Liu |
| 6,285,500 B1 | 9/2001 | Ranalli et al. |
| 6,323,974 B1 | 11/2001 | Harris et al. |
| 6,353,467 B1 | 3/2002 | Wong |
| 6,356,389 B1 | 3/2002 | Nilsen |
| 6,385,217 B1 * | 5/2002 | Singh et al. ................. 372/20 |
| 6,388,730 B1 | 5/2002 | Lindquist |
| 6,404,538 B1 | 6/2002 | Chen |
| 6,417,948 B1 | 7/2002 | Chowdhury et al. |
| 6,426,816 B1 | 7/2002 | Wu |
| 6,429,962 B1 | 8/2002 | Xu |
| 6,455,841 B2 | 9/2002 | Zhou |
| 6,498,680 B1 | 12/2002 | Zhou |
| 6,515,751 B1 | 2/2003 | Craighead et al. |
| 6,519,022 B1 | 2/2003 | Xu |
| 6,603,781 B1 | 8/2003 | Stinson |
| 6,621,580 B2 | 9/2003 | Myatt |
| 6,845,108 B1 * | 1/2005 | Liu et al. ...................... 372/20 |
| 2002/0126386 A1 | 9/2002 | Jordan et al. |
| 2003/0021304 A1 | 1/2003 | Pezeshki et al. |
| 2003/0026302 A1 | 2/2003 | Anthon et al. |
| 2003/0035119 A1 | 2/2003 | Myatt et al. |
| 2003/0063632 A1 | 4/2003 | Cruz et al. |
| 2003/0081309 A1 | 5/2003 | Nishi et al. |
| 2003/0081637 A1 | 5/2003 | Short |
| 2003/0086452 A1 | 5/2003 | Short |
| 2003/0090806 A1 | 5/2003 | Chen et al. |
| 2003/0090808 A1 | 5/2003 | Oike et al. |
| 2003/0107746 A1 | 6/2003 | Hedin et al. |
| 2003/0112837 A1 | 6/2003 | Vakhshoori et al. |
| 2003/0123131 A1 | 7/2003 | Boggy et al. |
| 2003/0169789 A1 | 9/2003 | Yoon |
| 2003/0173505 A1 | 9/2003 | Wipiejewski |
| 2003/0174331 A1 | 9/2003 | Chen et al. |
| 2003/0201966 A1 | 10/2003 | Pan |

* cited by examiner

WAVELENGTH LOCKER WITH LIQUID CRYSTAL TUNABLE FILTER GENERATING TRANSMITTED AND REFLECTED OUTPUTS

CROSS-REFERENCE TO RELATED APPLICATIONS

This application is a continuation of and claims priority from commonly assigned application Ser. No. 10/453,455 titled "Narrow Band Tunable Filter with Integrated Detector", filed Jun. 2, 2003 now U.S. Pat. No. 7,009,680.

FIELD OF INVENTION

This invention generally relates to wavelength lockers, and more particularly, to a wavelength locker suitable for use with fixed and tunable lasers.

BACKGROUND OF THE INVENTION

Laser frequency locking is an essential technology for optical communications and other fields. In telecommunications, Dense Wavelength Division Multiplexing (DWDM) systems require tight control and accurate tuning of each frequency propagated down an optical fiber by a communication laser. In DWDM, each of a plurality of laser signal sources is tuned in frequency to a distinct channel, allowing a plurality of signals to be simultaneously transmitted down a single optical fiber. In this way, large volumes of information can be transmitted through a single optical fiber. The communication channels are defined on a grid with equal frequency spacing in a band range approximately between 188-197 THz (the ITU grids).

Each laser must be stabilized, or "locked" to ensure it remains frequency-tuned to the proper communications channel. Frequency locking techniques must withstand environmental or systematic disturbances. A wavelength locker provides a stable and calibrated reference for measuring the wavelength deviation of a laser output from a desired wavelength. The signal from the wavelength locker is used to tune the laser wavelength back to the desired frequency. In a DWDM system, mistuning is highly detrimental to the performance of communications since DWDM components exhibit wavelength-dependent losses. In other systems, mistuning a laser can have various negative ramifications depending on the measurement, analysis or process facilitated by the laser. In telecommunications applications, wavelength lockers are critical because they allow for more closely spaced channels, thus increasing the information bandwidth of a DWDM system.

It is common to use a Fabry Perot etalon as a reference element in a wavelength locker. A Fabry Perot etalon is an interferometric device composed of 1 mm solid silica with partially-reflecting mirrored sides that are substantially parallel. A light beam passing through an etalon is expressed as an Airy function and the separation in frequency between the period peaks of the transmission response is called the Free Spectral Range ("FSR"). The FSR is defined by the optical path length of the gap between the etalon mirrors. Typically, a wavelength locker based on a Fabry Perot etalon will be designed so that the FSR of the etalon is matched against the frequency spacing of the ITU grid so that the etalon provides a calibrated reference to indicated the frequency location of the ITU channels.

Typically, frequency locking is performed in a feedback loop whereby the output of the laser is tapped and coupled to the wavelength locker which tracks the output from its etalon with a photodetector. The side of the etalon transmission peak is monitored for frequency discrimination against a reference value. The difference between the monitored transmission and the reference value is proportional to the deviation of the lasing frequency from the desired lock point. The difference then used as feedback into the laser control electronics, to adjust the lasing frequency to the desired lock point.

However, one known issue with the use of Fabry Perot etalon as a reference element in a wavelength locker is that power fluctuations in the input light are also capable of producing changes in the etalon transmission signal that mimic a frequency change, resulting in the potential to unintentionally detune the laser from the desired lock point. It is common to use a second photodetector to tap a power reference signal from the output of the laser to ensure that power fluctuations are differentiated between a frequency change. The power reference signal is used to normalize the etalon transmission signal to render it insensitive to changes in the input optical power.

Another known issue with the use of Fabry Perot etalon as a reference element in a wavelength locker is that temperature fluctuations to the etalon changes the optical path length of the etalon due to the material's thermal coefficient of expansion, thereby changing the FSR and peak locations of the Fabry Perot etalon and causing the laser to detune from the desired lock frequency. Thermally-induced changes to the etalon are normally mitigated by constructing the etalon from temperature-insensitive materials and mixing material stacks with offsetting coefficient thermal expansion (CTE) properties. However, the materials generally used to construct the etalon also exhibit a temperature-dependent refractive index. Often the only way to mitigate temperature fluctuations from impacting the performance of the device is to assemble and mount the etalon on a temperature controlled platform. The long lifetimes of telecommunications systems demand that wavelength lockers operate robustly over a very long period exceeding 20 years. Wavelength lockers most also be constructed to avoid the outgassing of superfluous material, to survive mechanical and thermal shock, and otherwise not age in an observable or detrimental way. Epoxies and adhesives used to assemble wavelocker systems are notorious for age-dependent power losses, outgassing, and inadvertent etalon effects.

In addition to the technical requirements of a wavelength locker device, the telecommunications market demands that wavelength lockers are physically no greater than 33 mm$^3$ and small enough to fit inside a 14-pin butterfly package along with the packaged laser. In addition, the telecommunications market demands that wavelockers exhibit a long lifetime and are inexpensive.

Finally, existing wavelockers are generally fixed and therefore require active alignment to match the 50% point exactly. Also, since each filter is optimized for a single wavelength, laser manufacturers are forced to stock an abundance of parts each having a frequency that matches the wavelength of the various lasers the offer.

As so, there is a need for a wavelength locker that has a small physical size. There is also a need for a wavelength locker with a size suitable for placement inside an associated laser package. There is a further need for a wavelength locker that operates robustly over a very long lifetime. Yet another need for a wavelength locker that does not use epoxies and adhesives in the beam path.

FEATURES OF THE INVENTION

The present invention contains several features and embodiments that may be configured independently or in combination with other features of the present invention, depending on the application and operating configurations. The delineation of such features is not meant to limit the scope of the invention but merely to outline certain options and features as they may relate to the present invention.

It is a feature of the present invention to develop a wavelength locker that may or may not be configured with epoxy or adhesives.

It is a feature of the present invention to develop a wavelength locker that may be configured to operate robustly over a long period of time.

It is a feature of the present invention to develop a wavelength locker that may be configured with a novel temperature compensation system.

It is a feature of the present invention to develop a wavelength locker that may be configured for use in a tunable or fixed laser.

It is a feature of the present invention to develop a wavelength locker that may be configured to provide power monitoring.

DETAILED DESCRIPTION

Throughout this application, like reference numbers as used to refer to like elements. For instance, the two substrates used to form the tunable filter of the present invention are referred to throughout this applications as 110A and 110B. Those supporting elements and features of the invention that are distributed on each substrate and later combined may be referred to under their index reference for a particular substrate XA, XB or for simplicity sake, under the shared reference X. In certain cases, a designated signal output from any device X may be referred to as X'.

Figure 1A:
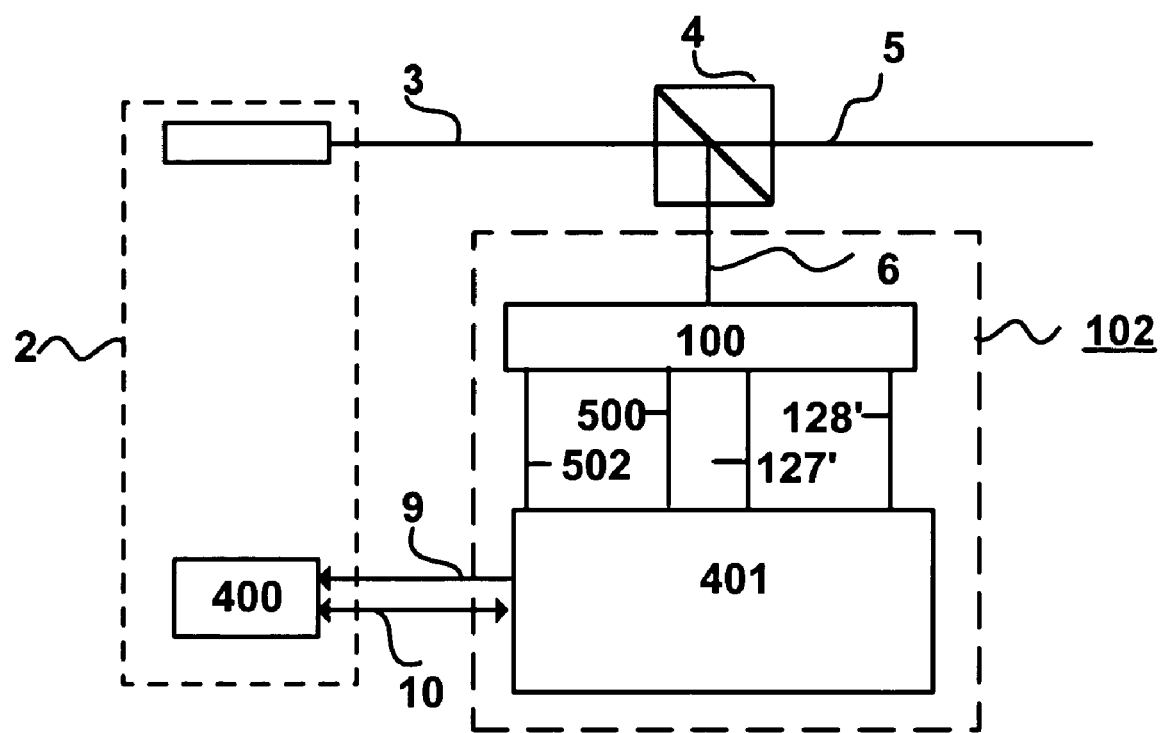
FIG. 1A shows an example laser system of the present invention.

A preferred embodiment of the present invention is presented in FIG. 1A, which shows a laser system 1 having a laser transmitter 2, tap 4 and liquid crystal wavelocker 102 including a tunable filter 100.

The description herein shall treat the laser transmitter and wavelocker devices as having independent control electronics. As so, for clarity sake and to facilitate a description that delineates the core feedback loop and operation of the devices, wavelocker 102 and laser transmitter 2 are configured with independent control electronics. However, it is within the scope of this invention to utilize a common control system that addresses both the laser transmitter 2 and the wavelocker 102.

Upon system initialization or when changing the frequency of a tunable laser 2, a command may be sent from laser 2 to the wavelocker over bus 10 to designate a lock frequency upon which the wavelocker shall be configured to lock onto.

During operation, laser output 3 is directed through tap 4 which splits the signal into a laser output signal 5 and tapped optical signal 6. The tapped optical signal 6 is received by tunable filter 100. Tunable filter 100 may of a selected type that includes a tunable etalon or tunable bandpass filter. Preferably, the tunable filter 100 is a liquid crystal bandpass filter controlled by way of a voltage potential 502 applied from control electronics 401 and wherein the applied voltage results in a change in the center wavelength of the tunable filter. In any case, the tunable filter 100 is tuned by an offset wavelength from the laser wavelength such that 50% power is transmitted at the laser's targeted lock point center wavelength. During operation, tunable filter 100 receives an optical input and produces two outputs comprised of a power intensity signal for the transmitted passband 128', and a power intensity signal for its reflected compliment 127', respectively. In the example shown, wavelocker 102 control electronics 401 processes both signals 127' and 128' and generates a feedback signal 9 that encodes a correction value proportional to the difference between the current lasing frequency and the target lock frequency. The feedback signal 9 is transmitted to the laser control electronics to complete a feedback loop. The feedback signal encodes a vector having a magnitude correction and direction in which to apply the correction. Feedback 9 may be generated using a microcontroller with integrated analog digital converter ("ADC") to convert the analog power intensity measurements 127' and 128' into memory for processing by microcontroller. The microcontroller or suitable device may be programmed or configured to divide the transmitted passband 128' power by the reflected compliment 127' power, forming a substantially linear feedback signal 9 output in the region around the lock point. The feedback signal 9 may be processed through a digital analog converter ("DAC") such that the output of the DAC couples directly to the laser transmitter 400 control electronics. Alternately, feedback 9 may be transmitted as word or byte to indicate the magnitude of the correction along with a i-bit direction state to indicate whether the correction and laser output is drifting above or below a target lock frequency. However, it is, preferred that the feedback signal is analog where by direction state and correction magnitude are encoded in a vector represented by a voltage, whereby positive and negative voltage indicates direction and magnitude that is applied to increase or decrease the lasing frequency, respectively. In this case, a zero voltage feedback signal 9 in the current example would indicate that no correction is necessary.

Figure 1B:
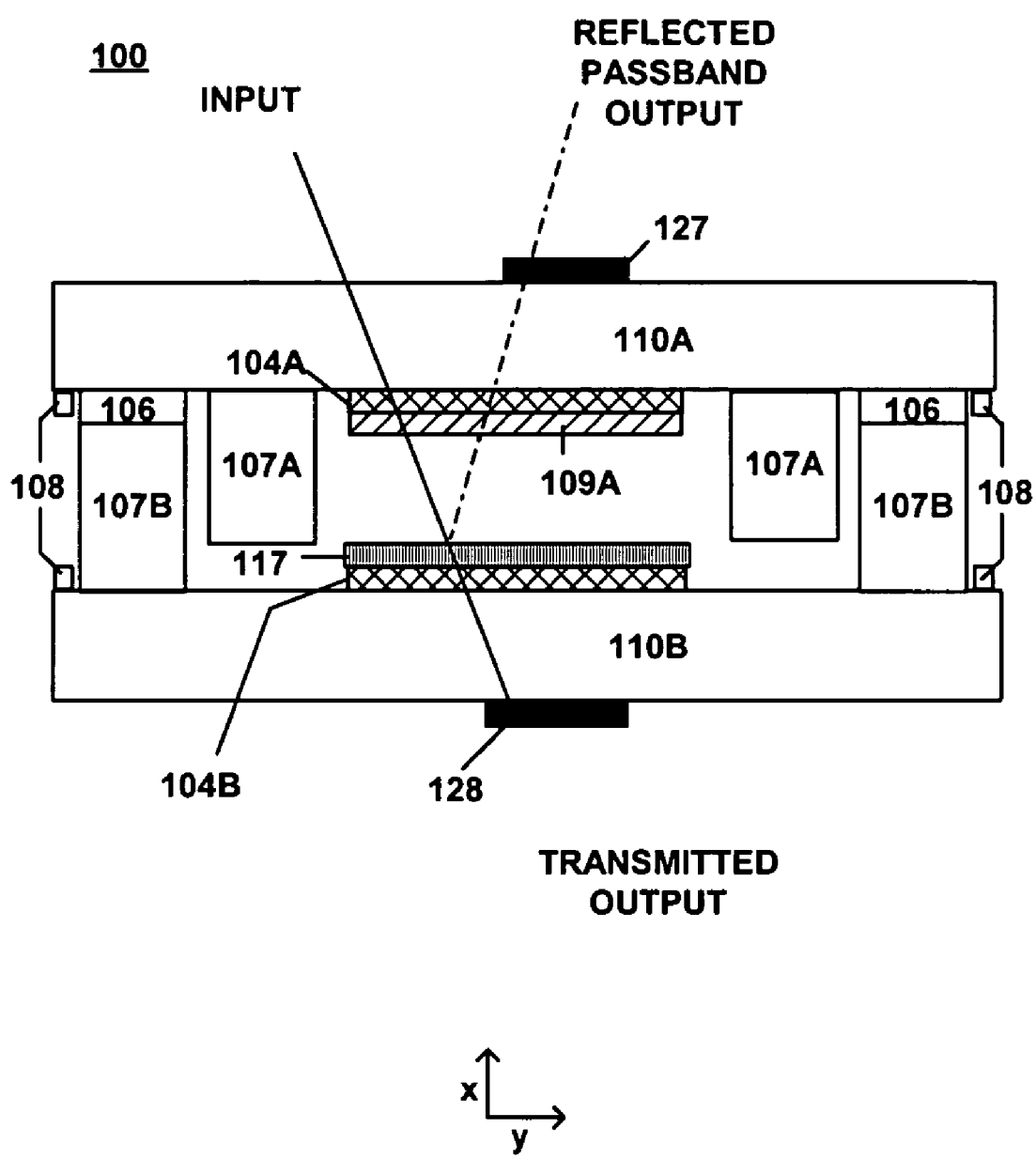
FIG. 1B shows the detailed liquid crystal tunable filter used in FIG. 1A.

The following description details one example tunable filter device that enables the capture of a filtered signal and its compliment, hereafter noted as required inputs for computing wavelocker feedback signal 9. FIGS. 1B and 1C show an example liquid crystal bandpass tunable filter 100 having a first substrate 110A in opposition to a second substrate 110B. In this embodiment, the first substrate has, in the aperture, an inner surface layer stack comprising a conductive electrode 104A and alignment layer 109A. Outside the aperture on the inner surface of the first substrate is a solder dam spacer element 107A and optional resistive heater and temperature sensor feature 108. In this embodiment, the second substrate 110B has an aperture layer stack comprising a conductive electrode 104A, and waveguide resonant grating filter 117. Outside the aperture, the second substrate has a seal comprising a substantially non-compressible spacer element 107B with a substantially compressible metal gasket 106. The second substrate also has an optional resistive heater and temperature sensor feature 108. On the outer surface of the first substrate and in the aperture is an patterned photodetector 127 (shown) used to convert the reflected passband output of tunable filter into an electrical signal 127' (not shown) and for computing feedback signal 9. Similarly, on the outer surface of the second substrate and in the aperture is a photodetector element 128 (shown) for creating electrical signal 128' (not shown) representing the power intensity of a transmitted signal compliment of the passband output and also used for computing feedback signal 9.

Figure 2:
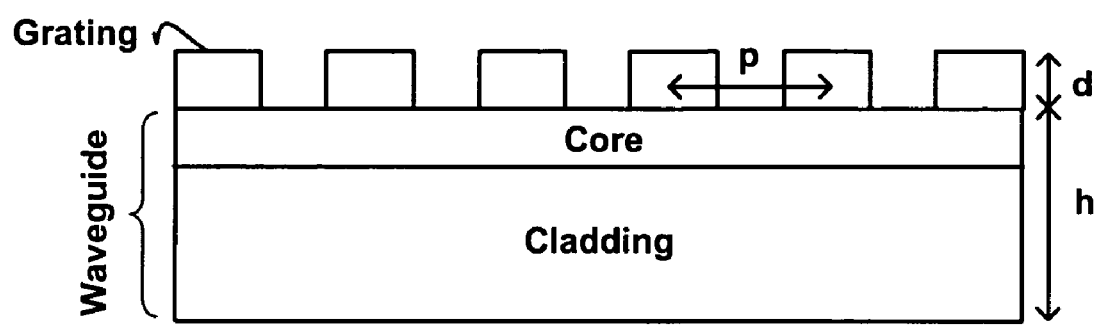
FIG. 2 shows an example waveguide grating optical filter of the present invention.

The example tunable filter of FIG. 1 accepts an input signal that passes through the aperture of the liquid crystal cell, producing a Lorenzian passband output that is reflected off the waveguide structure 117 (shown by way of dotted line). An input angle, alpha, defines the optical path of the reflected passband output. Changes in this angle require a change in the grating period and/or waveguide material in order to maintain optimization over the same wavelength range. The reflected passband output has 2*alpha degrees of separation from the input beam and diverges from the waveguide 117. The transmitted output beam is a continuation of the input beam minus the reflected passband output. It is preferred that the alpha angle is around 10 degrees to satisfy the optical path constraints implied the design. As shown in FIG. 2, the grating filter 117 consists of gratings on planar waveguide that are nominally transparent to an incident plane wave away from the resonance condition but reflect the externally incident plane wave at the resonance condition. Tuning the filter element 100 is achieved by application of a voltage across the conductive electrode layers 104A and 104B, which imputes a change in index of refraction and resonant wavelength of the waveguide structure according to the phase condition for propagation of a guided mode satisfied by:

$$2k_2h + 2\phi_{12} + 2\phi_{23} = 2m\pi$$

where m is the mode number, k2 is the wave vector of light in the x direction in the waveguide, h is the waveguide thickness and $\phi_{12}$ and $\phi_{23}$ are the two Fresnel phases due to the waveguide interface internal reflections.

The grating on top of the waveguide 117 implies a grating vector that may be represented as:

$$K = 2\pi/\lambda$$

where $\lambda$ is the grating period and the value of the grating vector K is approximately the same as that of the mode propagation constant in the z direction, $\beta$, which is $$\beta^2 = \epsilon_2 k_0^2 - k_2^2,$$

where $k_0$ is the wave vector of the incident wave, k2 is the wave vector of light in the x direction in the waveguide, and $\epsilon_2$ is the dielectric constant in the waveguide. As so, the total destructive interference at resonance will obtain a total output transmitted field E, given by $$E = S_t E_0 + \exp(-i\pi) \frac{S \exp(i\Delta)}{1 - |1 - S| \exp(i\Delta)} E_0$$

Where St is the diffraction coefficient that relates the incident wave to the wave initially transmitted through the waveguide, $\Delta$ is the dephasing introduced by a deviation of the wavelength or incident angle at the resonance condition, i is the incident wave, E0 is the energy transmitted away from resonance, and s is the diffraction coefficient relating the physical parameters of the waveguide grating (the Fresnel phase of waveguide interface, the dielectric constant difference in the grating region, the wave vector of the incident wave, the $1^{st}$ order Fourier components of the modulated dielectric constant of the grating, the depth of the grating surface relief, and the wave vectors in the liquid crystal and waveguide regions).

Figure 3:
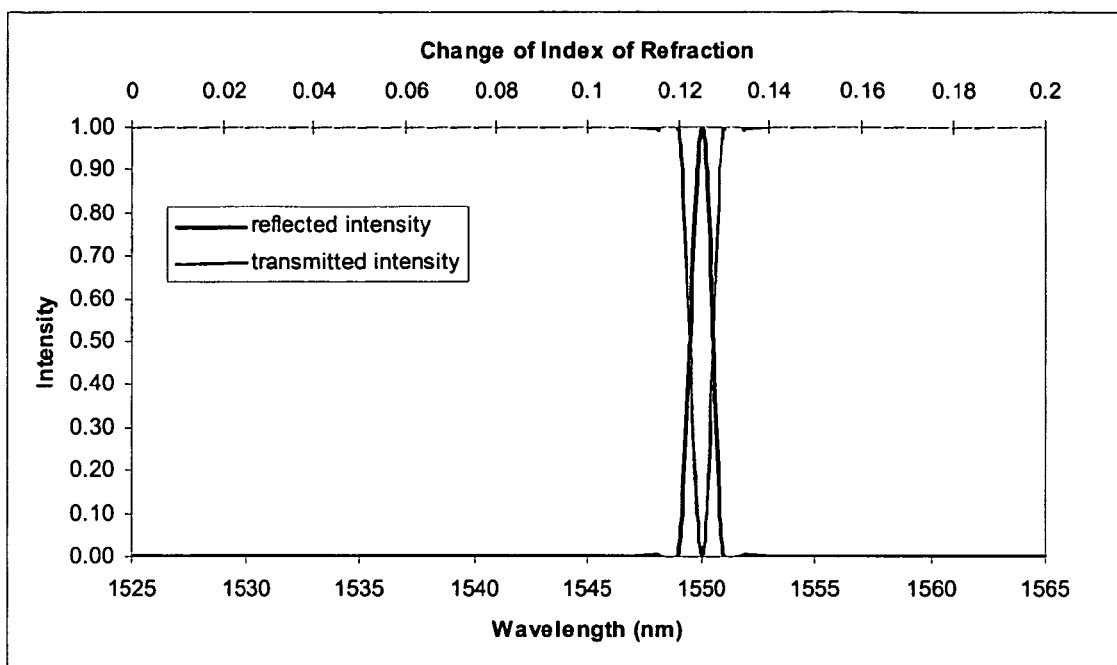
FIG. 3 shows an example tunable filter passband output profile as a function of index of refraction.

The waveguide grating filter may comprise a grating and waveguide. The grating may be formed of silicon nitride. The grating period, P, may be 200 to 900 nanometers depending on the frequency of operation, however it is preferred for telecommunications frequency applications in the C and L bands, that the period of the grating be 450 nanometers and depth, D, approximately 220 nanometers. The grating may be sourced from NanoOpto Inc. of Somerset N.J. or formed by way of nano-imprint lithography or similar lithography processes as generally understood in the art or herein described. The waveguide may comprise a silicon nitride core approximately 480 nanometers thick and a silicon dioxide cladding approximately 1.5 microns thick. While the index of refraction of the waveguide may be 2.3 to 3.05, it is preferred that the index of refraction be 2.95. The waveguide may also be sourced from NanoOpto Inc. of Somerset N.J. or formed by way of thin film deposition as generally understood in the art. FIG. 3 shows the reflected passband and transition waveforms based on the aforementioned parameters.

Based on the model above, the tuning range of the liquid crystal tunable filter pixel of the present invention may exceed 100 nanometers. In order to reduce the sensitivity of the frequency to control voltage, filters with smaller tuning ranges may be configured to suite the operating requirements.

While a specific example tunable filter is provided, it should be understood that a liquid crystal tunable etalon may be configured with integrated photodetectors in a similar matter as described above. In this case, the liquid crystal cell gap thickness would be on the order of 100 times larger that the present example, or about 1 mm. The waveguide 117 would no longer be required and partially reflective coatings would be applied to the substrates to form the etalon cavity. Tuning of the etalon would be by way of a voltage applied to the conductive electrode layers 104A and 104B. Further-more, it should be understood that any tunable filter, including those that operate on principals other than liquid crystal, may be used in the present invention provided that the tunable filter is configured, coupled to, or integrated with means for capturing both components of a filtered signal i.e. the passband and its compliment. In all embodiments of the present invention, both the passband and its compliment are critical inputs necessary to produce an output feedback signal.

Figure 4A:
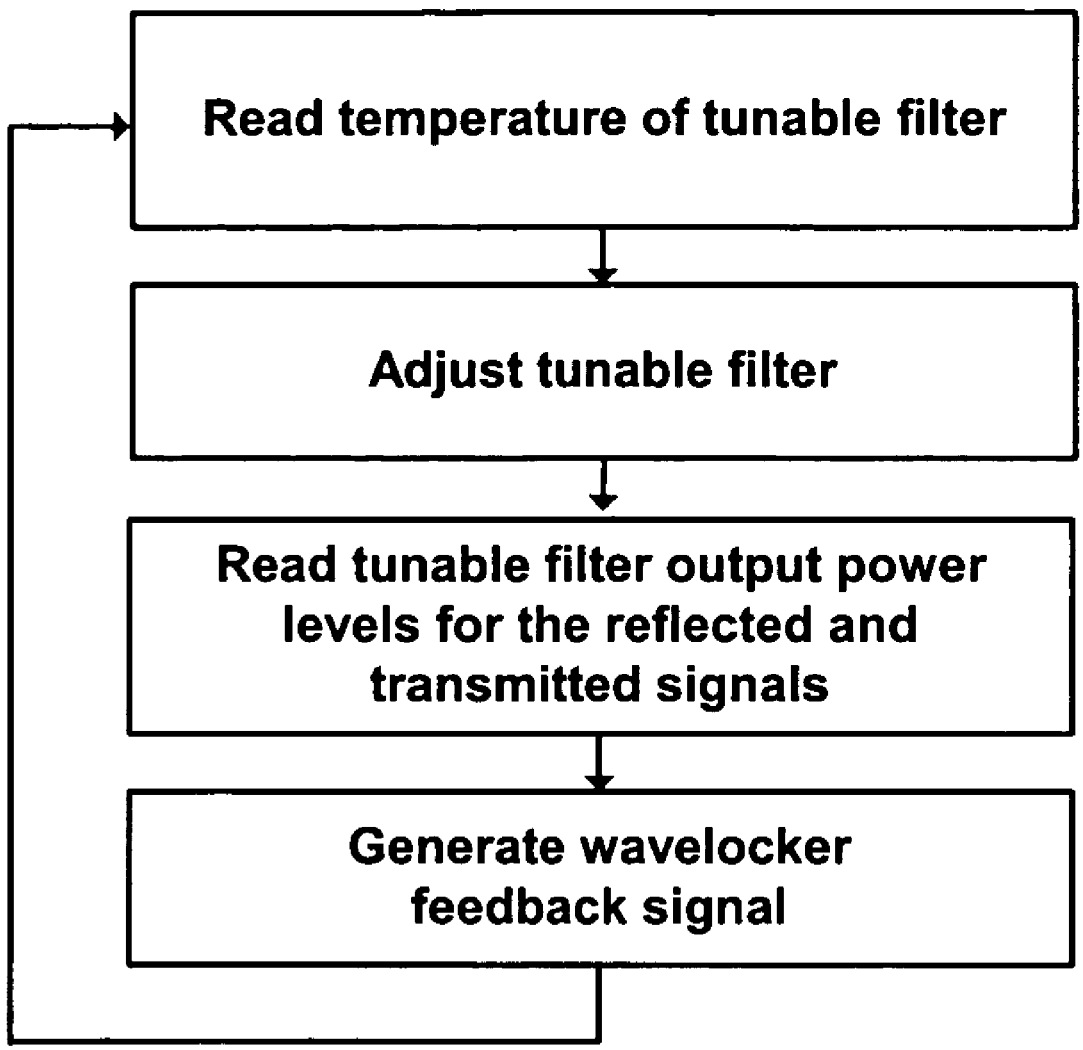
FIG. 4A shows an example wavelocker flow cycle of the present invention.
Figure 4B:
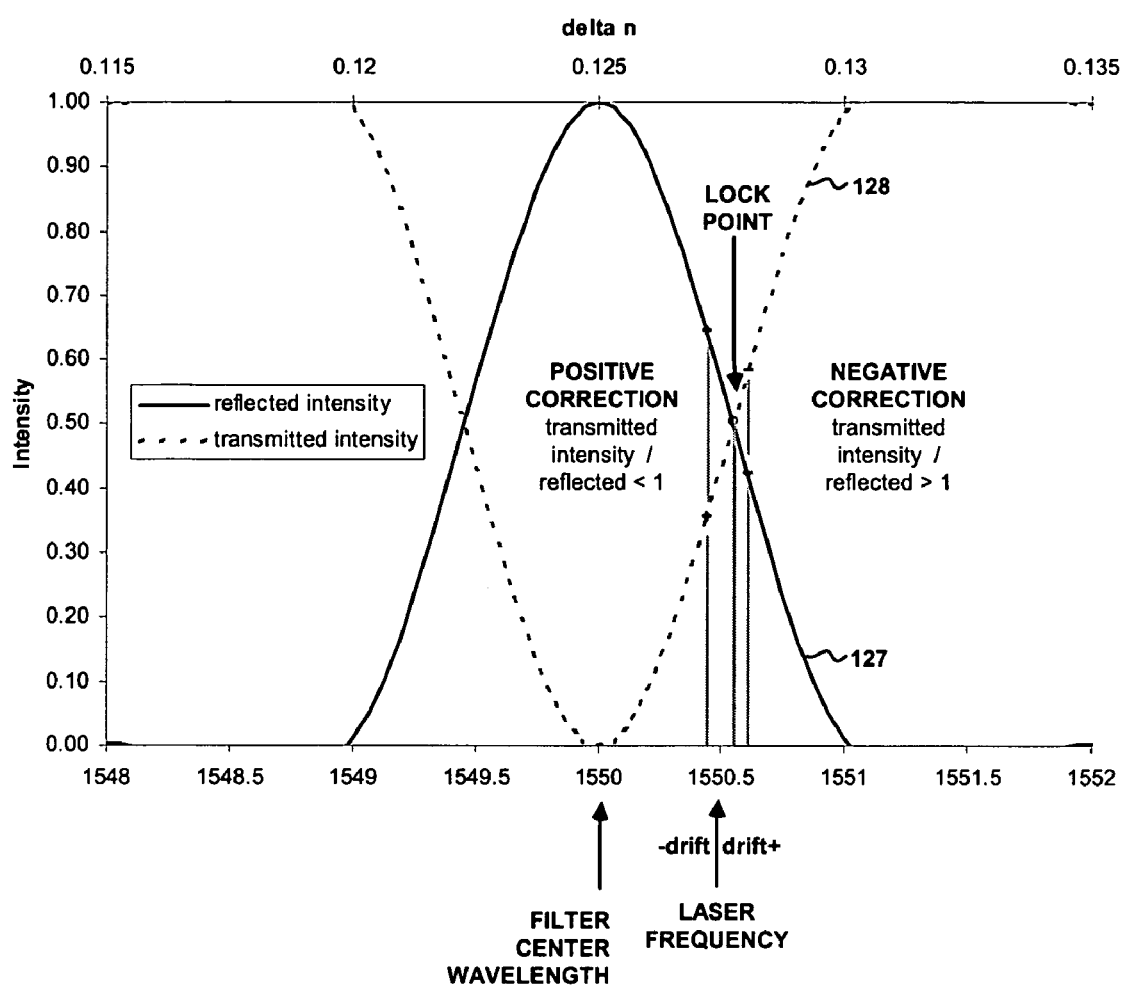
FIG. 4B shows an example waveform reflected passband and transmitted complement of the present invention.

FIG. 4A shows an example wavelocker flow cycle. With respect to FIG. 4A, the first steps in the flow cycle are directed to assuring the accuracy of the reference tunable filter. Specifically, step one involves reading the temperature of the tunable filter and step two involves adjusting the tunable filter in response to the temperature reading; these are described in the Thermal Management section of this application. Step three requires capturing the output of the tunable filter power level for the reflected and transmitted signals, and involves coupling optical signals into the output of the photodetectors 127 and 128 to yield a power level for the passband and transmission output. Step four requires generating a wavelocker feedback signal in response to the captured output, and this involves the computation of the feedback signal as previously described. FIG. 4B shows an example waveform reflected passband and transmitted compliment. As shown on FIG. 4B, a point exists at the 50% power intensity signal where a reflected passband function crosses or intersects with the transmitted compliment function. It should be noted that the tunable filter may be set at a positive or negative offset from the desired lasing frequency. In the example filter shape shown, the center wavelength of the tunable filter is approximately 0.6 nanometers less than the desired lasing frequency. The example is configured in negative offset but may alternately be set to 0.6 nanometers greater than the desired lasing frequency and the opposite side of the transmission curve would be used to derive the lock point. In one case, as the laser drifts below the lock point the resulting feedback signal (computed by dividing transmitted intensity by reflected intensity) is less than 1 so a positive correction is applied to the laser to correct for the drift. On the other hand, as the laser drifts above the lock point, the result of the feedback signal is greater than one, so a negative correction is applied to the laser to correct for the drift.

Fabrication

With respect to all embodiments, it is generally preferable that substrate 110 be comprised of glass but other substrate materials, including Garnet, silicon, polymers, etc., may be suitable depending on special pixel constructs and tailored tunable applications.

Figure 5:
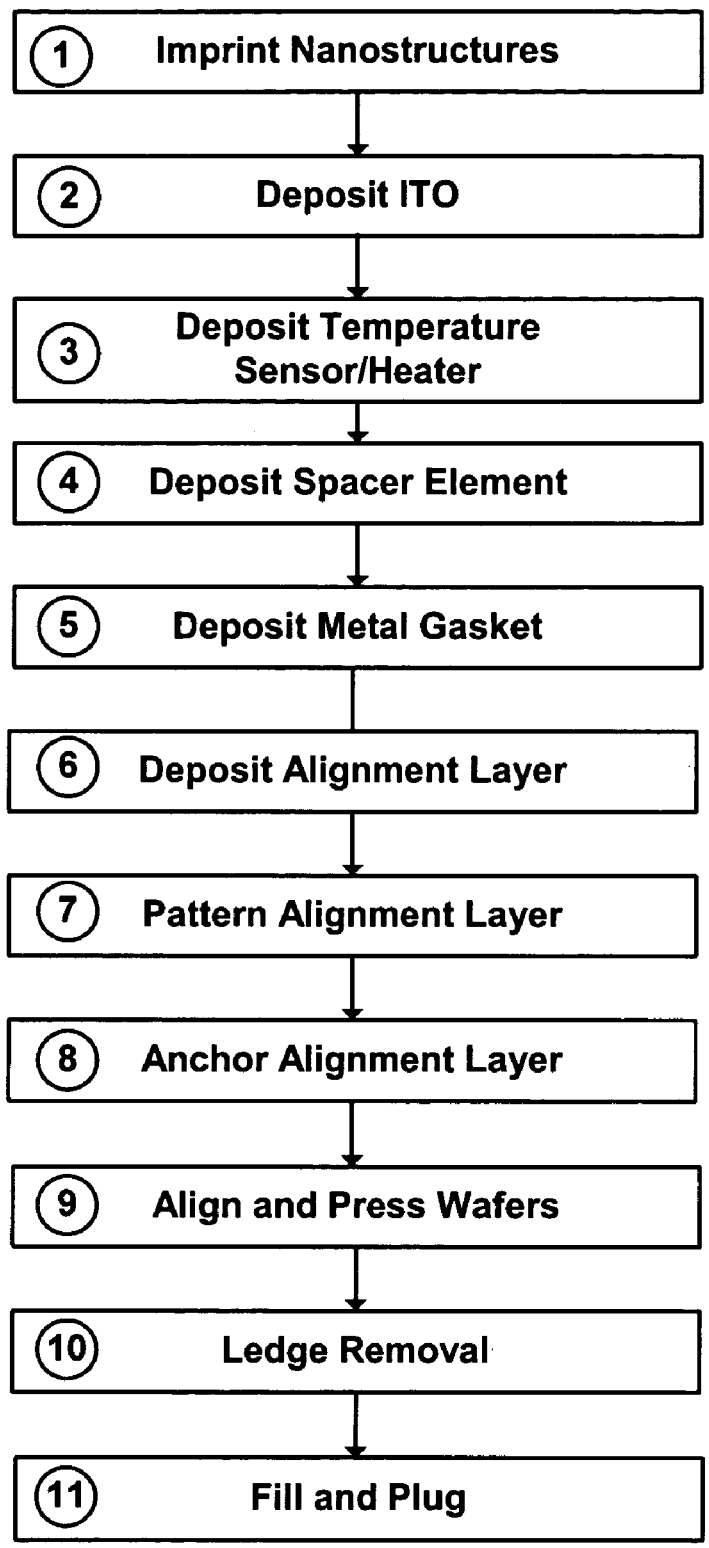
FIG. 5 shows one process flow for fabricating the tunable filter of the present invention.

FIG. 5 shows one example fabrication process to create an example liquid crystal tunable filter 100 having means for capturing a passband and compliment signal. Various optional steps may be omitted depending on the embodiment of configured features.

With respect to FIG. 5, step one involves integrating the optical elements and layer stacks into the first and second substrates. The optical elements may be formed by way of nano-imprint lithography techniques or similar methods known in the field and including those based on impressing a reference mask into photo resist to create surface relief patterns on the substrate where the surface relief photo resist pattern is etched to form grating features in the nanometer range. Preferably, the optical elements are deposited nanostructured gratings such as those available from NanoOpto Corporation of New Jersey who specifically offer a required optical element waveguide resonant grating 117.

With respect to process step 1, the substrates are etched using nanoimprint lithography or similar methods known in the field and including those based on impressing a reference mask into photo resist to create surface relief patterns on the substrate where the surface relief photo resist pattern is etched to form grating features in the nanometer range. The deposition of a thin film photodetector 127 and 128 may be formed by way of iterative processes, including multiple deposition stages to apply the appropriate PIN diodes and based on amorphous, polycrystalline and microcrystalline materials for a completely absorbing photodetector, or silicon and germanium alloys for a partially transparent photodetector. In addition, nanoimprint lithography techniques may also be used to create photodetectors. Conductors for connecting to and contacting the photodetectors may be made from various metals or metal-oxides, including but not limited to gold and indium tin oxide. Metals are preferred if the form factor allows electrical routing outside of the aperture while a transparent metal-oxide is preferred if the form factor requires electrical routing to be contained inside the aperture.

Figure 6A:
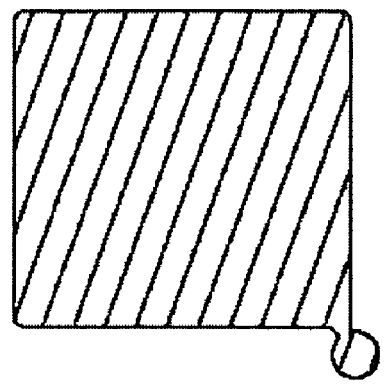
FIGS. 6A and 6B show four pixel indium tin oxide (ITO) electrode forming masks of the present invention.
Figure 6B:
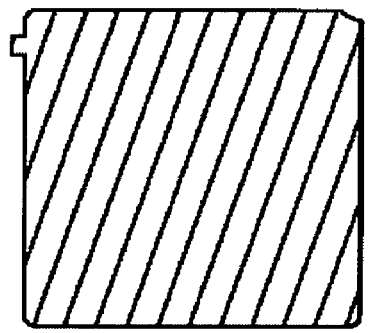

Step two involves adding the appropriate indium tin oxide ("ITO") (or other transparent conductive material) patterns to the first and second glass substrates to form the liquid crystal electrodes. With respect to process flow two of FIG. 5, a standard PECVD process may be used to apply thin film of ITO approximately 100 angstroms thick. FIGS. 6A and 6B show example ITO masks that may be used to pattern substrates 110A and 110B, respectively.

Figure 7A:
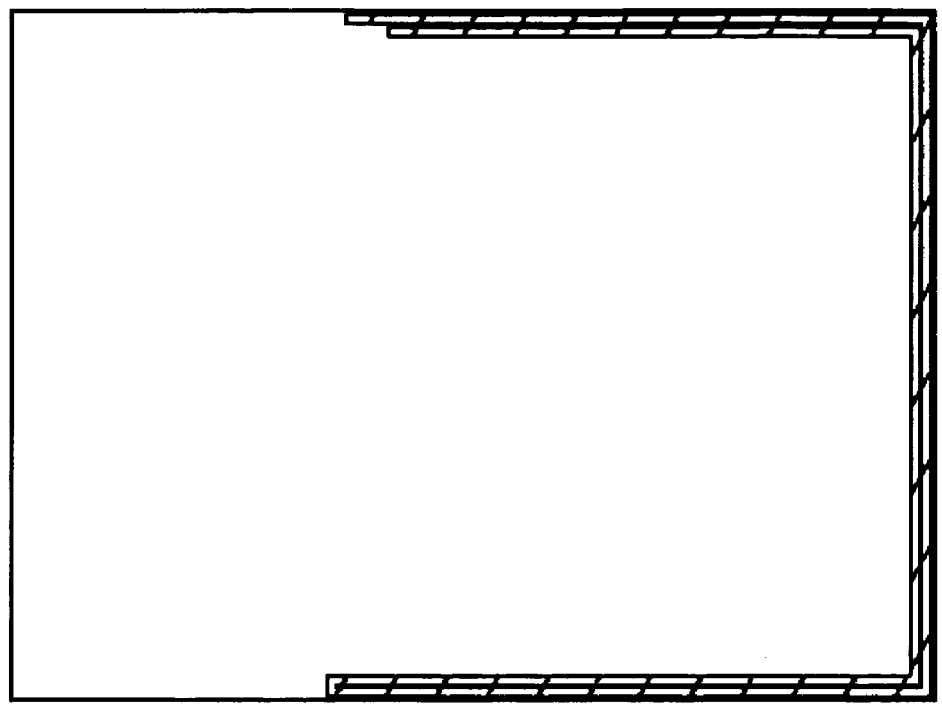
FIGS. 7A and 7B show example integrated active thermal element forming masks of the present invention.
Figure 7B:
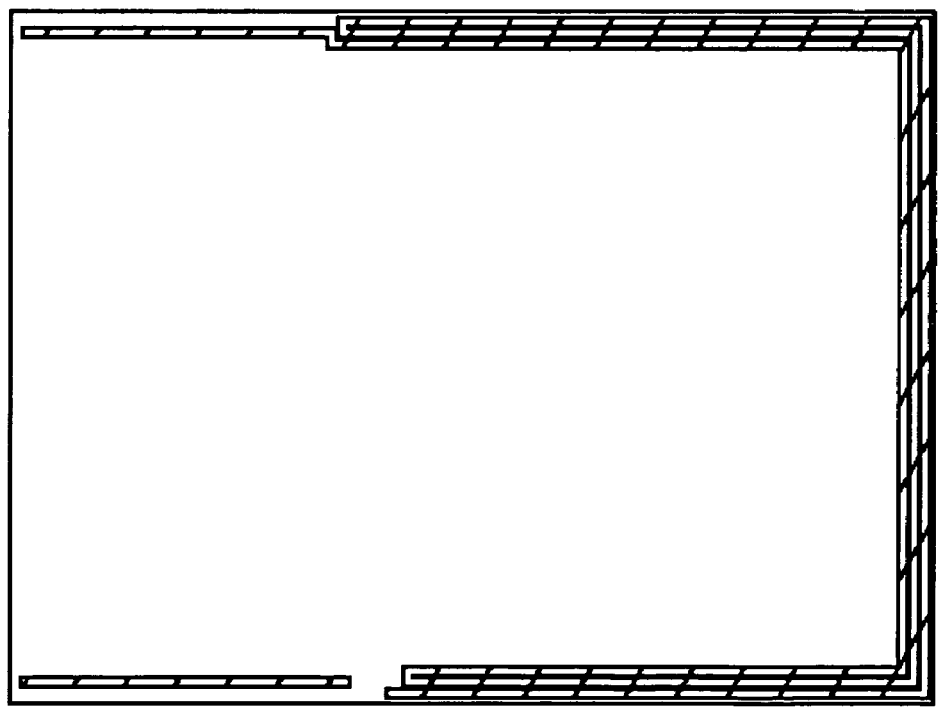

Optional step three involves creating the active thermal element, integrated heater and temperature sensor. FIGS. 7A and 7B show example masks that may be use with respect to step three of FIG. 5, in which a seed adhesion layer of chrome is first deposited approximately 200 angstroms thick onto the substrates, followed by a PECVD deposition thin film platinum resistor layer approximately 2000 angstroms thick and forming the upper and lower portions of the integrated heater/temperature sensor. The upper and lower portions of the integrated device, applied to substrates 110A and 110B, may be separated by an air gap approximately 9.6 microns and interconnected by VIAS formed from a metal deposition step that will be described in succeeding step eight. Again, it need be stated that gap thickness is delineated for example purposes and will change depending on the desired application. It should be stated that, depending on the configuration, the platinum thin film resistor may be patterned in various shapes, including but not limited to arched, curved, circular, zigzag, stripped as well as a serpentine pattern. Given the resistivity of the thin film platinum, approximately 10.6E-8 ohm meters, the example shown yields approximately 100 ohms resistance at room temperature.

Figure 8A:
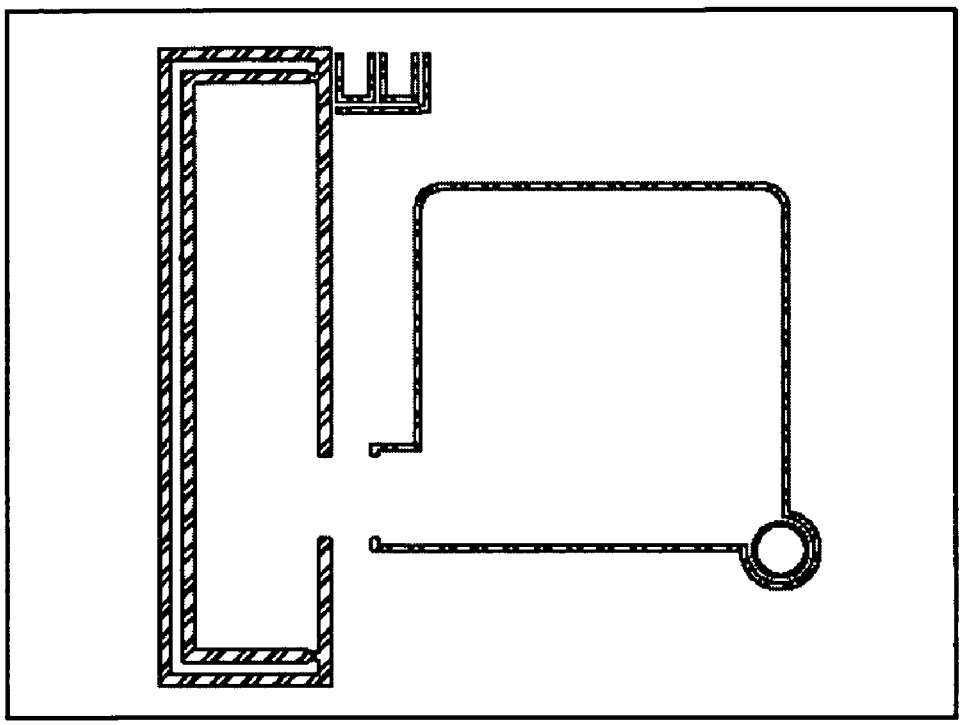
FIGS. 8A and 8B show example spacer element forming masks of the present invention
Figure 8B:
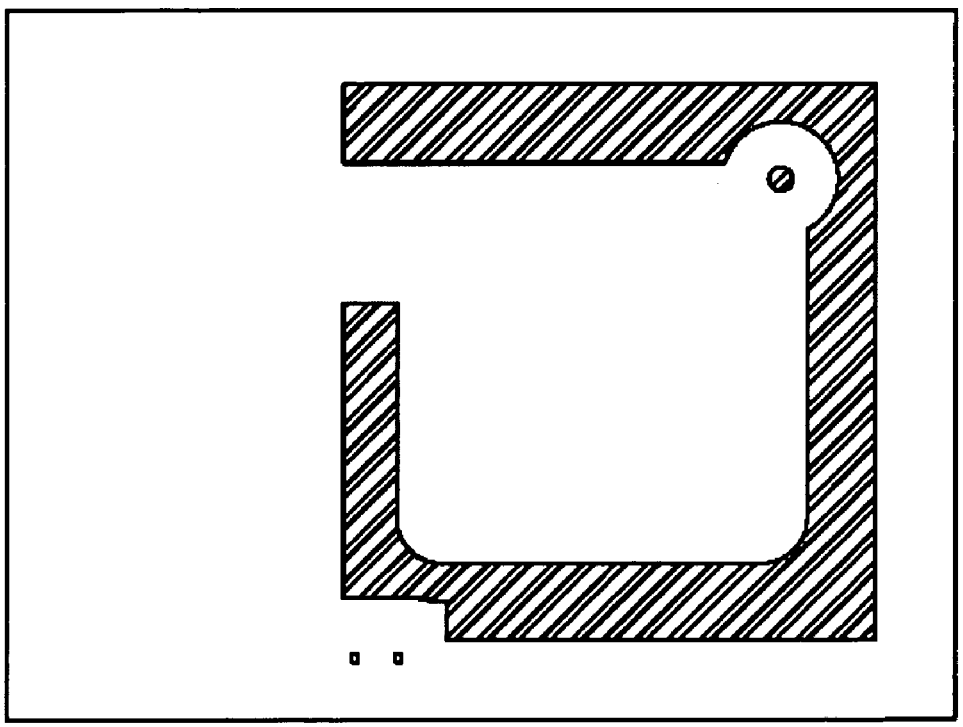

Step four involves creating the spacer element 107B and the solder dam 107A. Spacer element 107B controls the gap thickness of the liquid crystal cell while solder dam 107A is used to block reflow solder from entering the aperature in step 9 below. It is preferred that the spacer element is deposited on one of the substrate in a location that shall overlap with the location of a gasket. The combined cell 100 gap thickness may be formed with a tolerance based on the deposition process. It is preferred that the spacer element 107 be 9 to 11 microns thick. Niobium Pentaoxide is the preferred material for creating the spacer element, however other materials such as ceramics, silicon dioxide, aluminum oxide, silicon nitride, silicon monoxide and other materials compatible with thin film deposition processes that do not substantially compress may also be used as an alternative provided they are compatible with the selected liquid crystal substrate material. FIGS. 8A and 8B show an example mask that may be used to perform the process step four of FIG. 5, where a patterned layer of 9 to 11 microns thick of Niobium Pentaoxide is deposited onto each substrate and topped with an electrolyte protection layers of titanium and platinum.

Figure 9A:
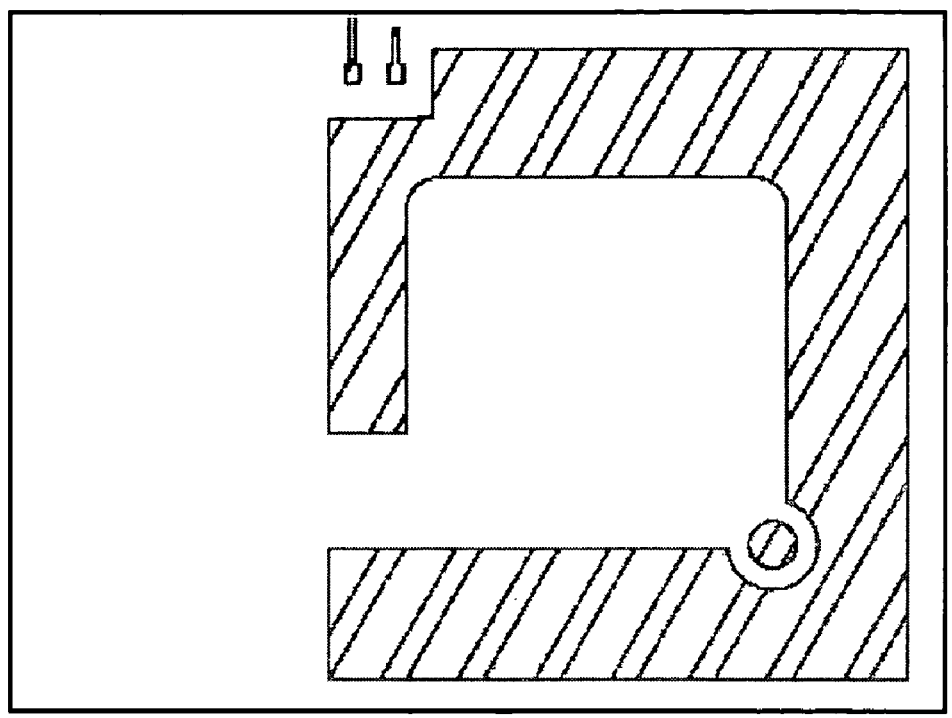
FIGS. 9A-9E show example masks for defining a metal gasket element layer of the present invention.
Figure 9B:
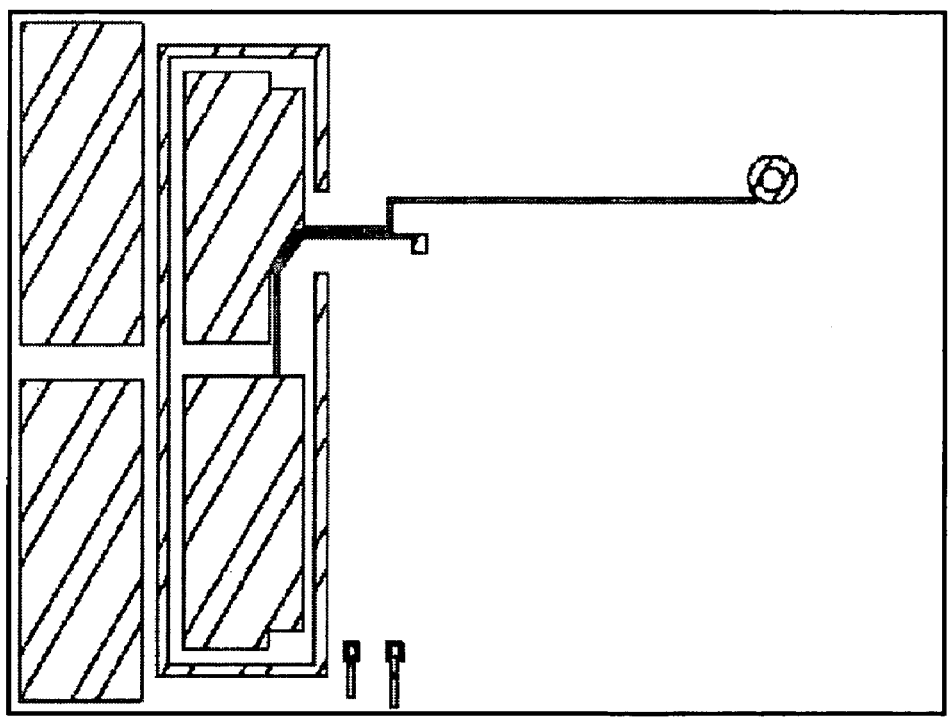
Figure 9C:
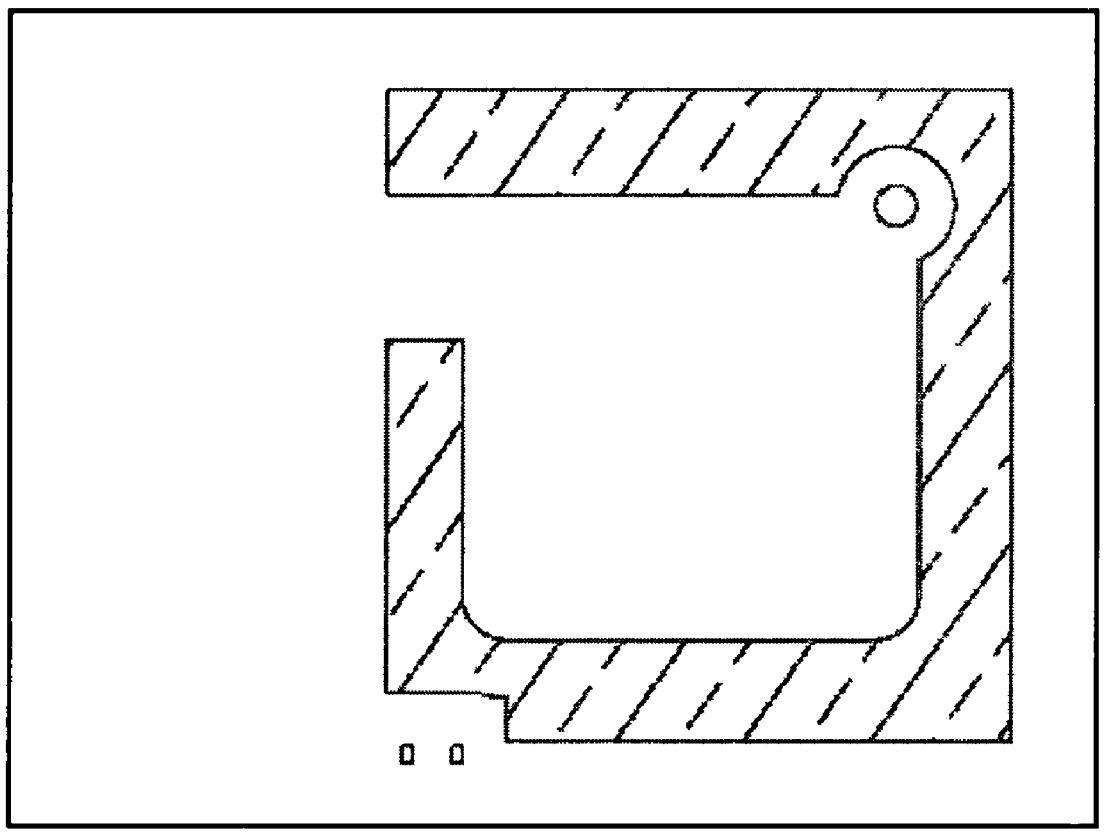

Step five involves creating the metal gasket element 106 and electrical routing and interconnections. Metal gasket element 106 may be made from a variety of metals, including but not limited to, indium, gold, nickel, tin, chromium, platinum, tungsten, silver, bismuth, germanium and lead. However it is preferable to use a gold/tin composition because of its high strength and low melting temperature. FIGS. 9A through 9C show example masks that may be used to perform process step five of FIG. 5. An adhesion layer of nickel and copper is first applied before a 0.4 micron gold pad layer to substrate 110A using the mask of FIG. 9A. An adhesion layer of nickel and copper is also first applied before a gold electrical signal interconnection deposited to substrate 110B under the mask of FIG. 9B. A titanium adhesion and platinum oxidation reduction layer is first applied before a 3 micron metal gasket gold/tin deposition onto substrate 110B, over the spacer element, using the mask of FIG. 9C. It is generally preferable that metal gasket layer of this process step is deposited wider than the spacer element of the previous step due to seepage that occurs during the additional processing steps. Metal gasket masks may be configured to form referential vias that enable electrical interconnection between features deposited on either substrate 110A or 110B. Vias may also be configured on the opposite side of the substrate to simplify routing external contact pads to the photodetectors 127 and 128 and to temperature sensor and heating element 108. The vias may be positioned to overlap the heater/temperature sensor and ITO layer so as to define contact pads to drive the two electrodes of the liquid crystal cell.

Step six involves adding a polyamide alignment layer to the second substrate 110B. With respect to process flow six of FIG. 5, standard spin coating stepped processes may be used at room temperature to create a layer of polyimide approximately 7000 angstroms thick on the second substrate. Alternately, depending on the configuration of the tunable filter, step six may also be configured without any polyamide alignment layer when the alignment is achieved with gratings instead.

Figure 9D:
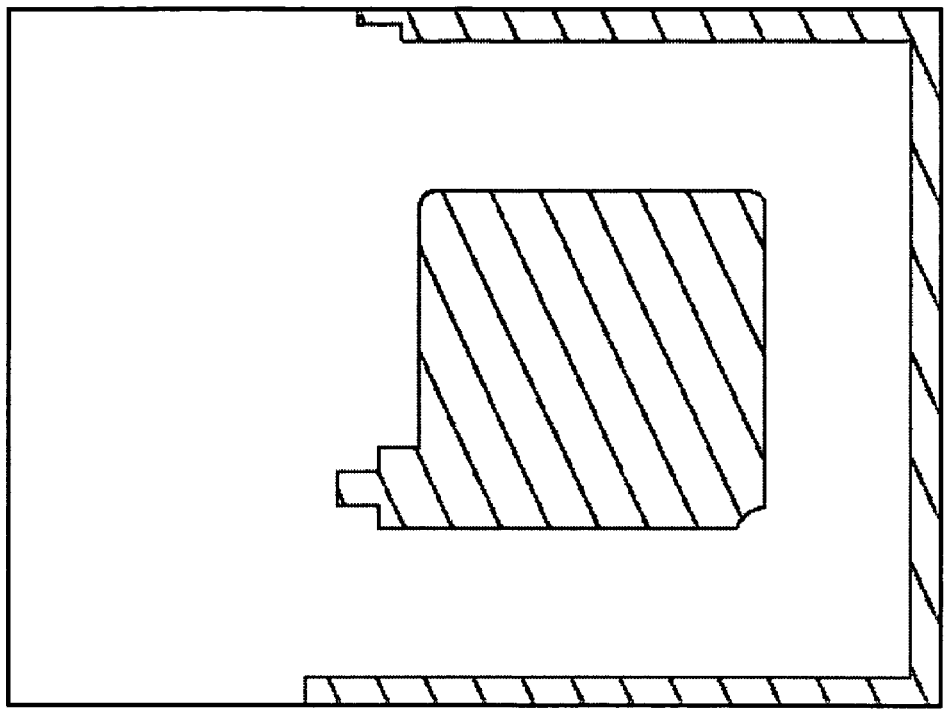
Figure 9E:
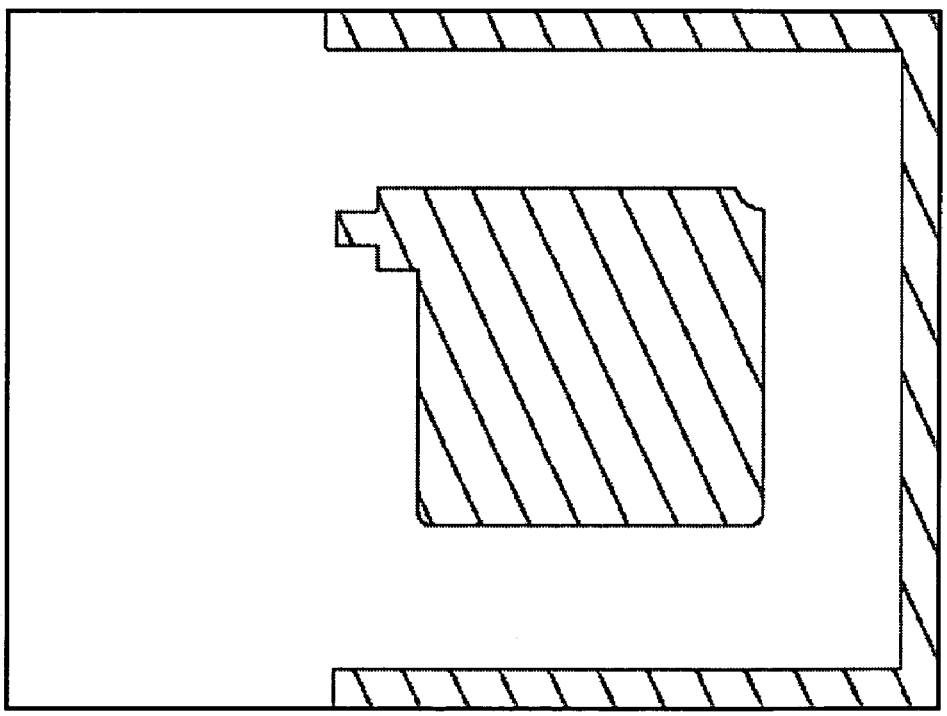

Step seven involves patterning the polyimide layer. With respect to process step seven of FIG. 5, photo resist may first be applied to substrate 101B and masked using traditional photolithography techniques or laser etching. Wet or dry etching performed thereafter may result in a pattern of polyimide as shown in FIGS. 9D and 9E.

Step eight involves anchoring the liquid crystal alignment layer. With respect to process step eight of FIG. 5, one traditional method is to rub the polyimide to form the alignment layers. In the electronically conductive birefringence ("ECB") configuration of the present invention, the rubbing direction of the second substrate may be anti-parallel to the equivalent homeotropic alignment provided by the grating waveguide filter 117. A first alternate method of forming the second substrate alignment layer is to an imprint lithography technique where a reference mask is pressed onto a deposited photo resist layer to create surface relief patterns in the photo resist which is subsequently etched to form high precision alignment grooves with nanoscale tolerance.

Steps six, seven, and eight as mentioned above may be replaced by a second alternative method of the anchoring step and involves the use of a photo sensitive anchoring medium, such as Staralign by Vantio of Switzerland. The photosensitive anchoring medium may be spin applied to the substrate 110B and masked to achieve specific anchoring energy and direction. UV light masking of various patterns, including specific directional application may be used.

Step nine involves aligning and pressing wafers 110A together with 110B. It is known that visual alignment reference marks may be etched into the underlying wafer, or that a physical feature of the glass sheet such as an edge or alignment hole may be used to perform wafer alignment. However, a high yield method of accurately aligning the relative position of the two glass substrates without the need for expensive high precision alignment equipment is hereby presented, in which complimentary interlocking geometric features deposited on each substrate, mate with each other to prevent relative movement of the glass sheets during the bonding and pressing process. Such interlocking features mitigate any non uniformity in the bonding process and given that the typical gap between two glass sheets of a liquid crystal cell is less than 20 micrometers, thin film deposition or screening processes can be used to create precisely controlled and repeatable geometric features. With respect to process step nine of FIG. 5, the substrates 110A and 110B may be brought together, aligned under pressure at room temperature to form a chemical bond metal gasket at the gap distance defined by the sandwich spacer elements formed from both substrates.

Figure 10A:
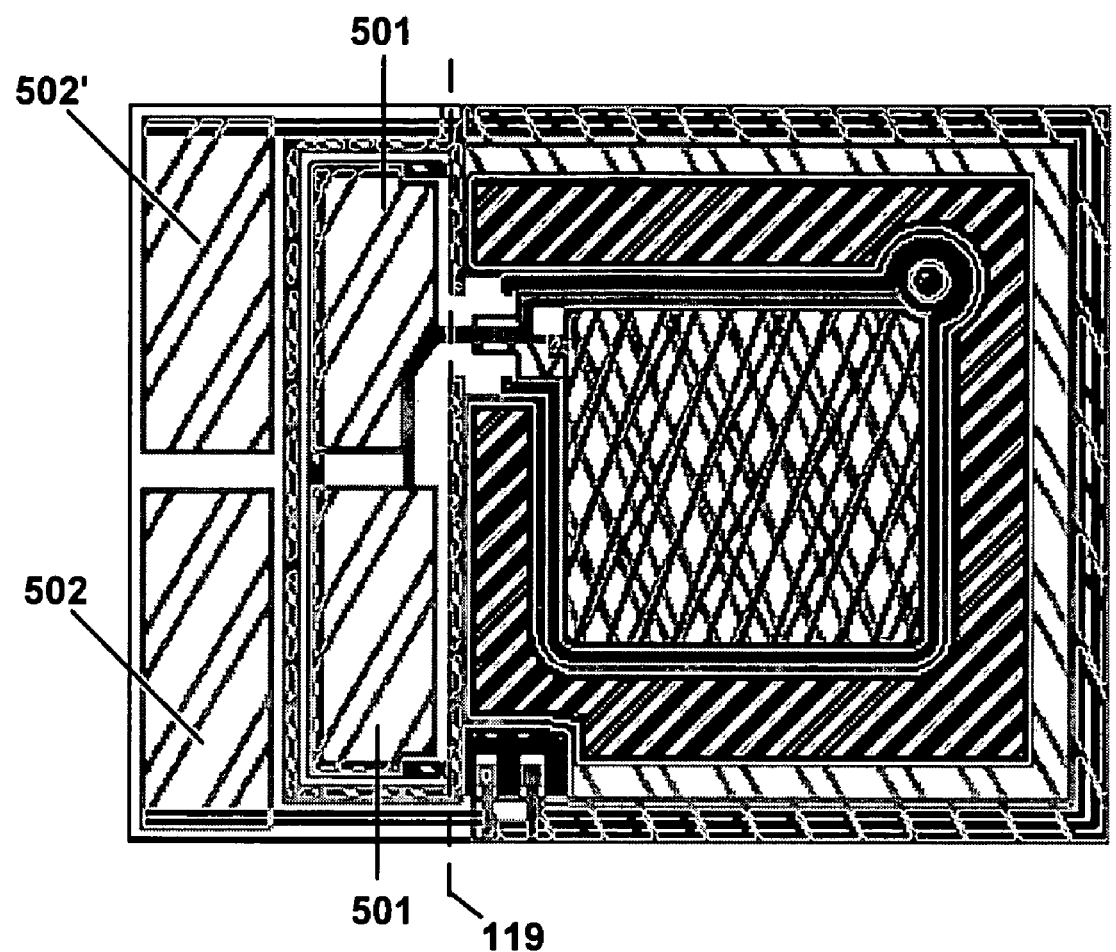
FIG. 10A shows an example top view integrated perspective showing the relationship between various layers of a one dimensional (1.times.N) array configuration of the present invention.
Figure 10B:
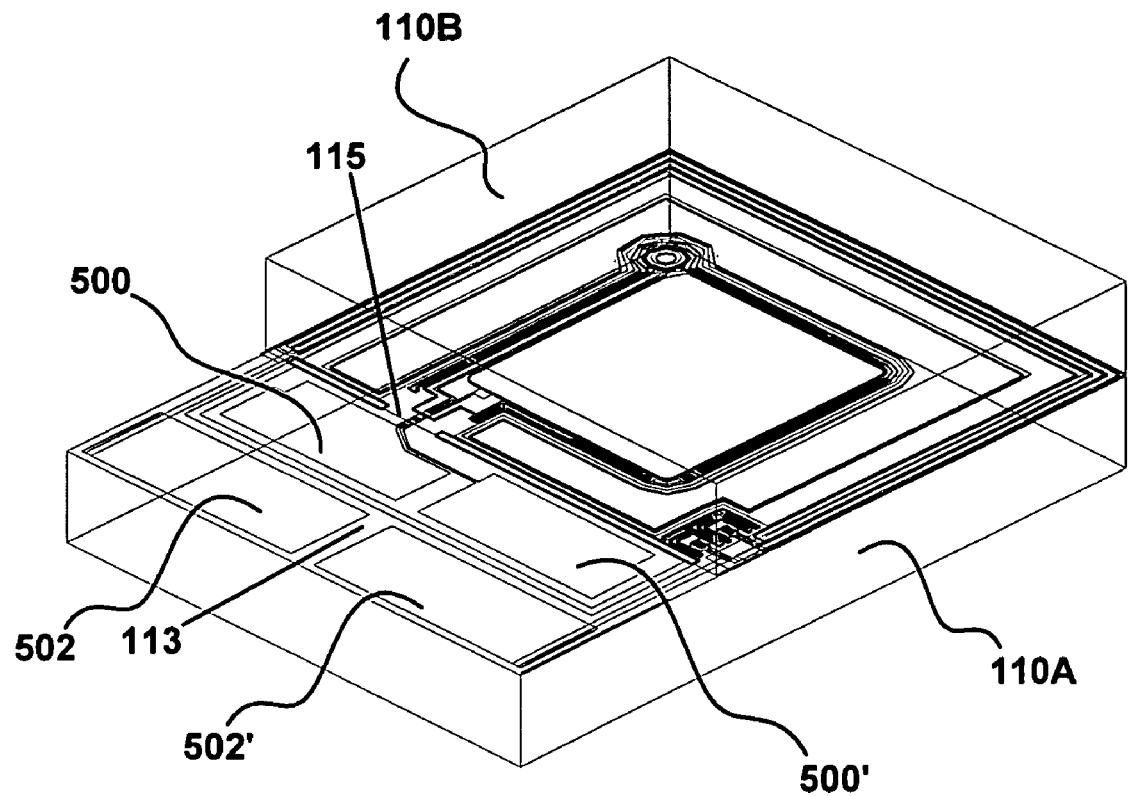
FIG. 10B is an isometric view showing a nine pixel (N.times.M) two dimensional liquid crystal cell at the termination of the fabrication process.

Step ten involves removal of a portion of protective glass on the liquid crystal cell. FIG. 10A shows a top perspective of the various layers that combine through the substrates when interposed thereupon each other in a fully configured embodiment of the present invention. With respect to process step ten of FIG. 5, the substrate 110B is scored using a diamond dicing saw to cut a trench approximately 90% through the thickness of the substrate and forming the break off line 119 of FIG. 10A. A portion of the substrate 110B is broken off along the break off line 119 to define an access surface 113 of FIG. 10B that provides access to the underlying liquid crystal electrode contact pads 500 and 500', the underlying liquid crystal heater/temperature sensor element electrical contact pads 502 and 502', as well as to the liquid crystal fill port 115.

Step 11 involves filling the liquid crystal device with a liquid crystal molecules, process 212 of FIG. 5. This step may be performed using traditional methods of filling a liquid crystal cell, whereby the cell is placed in a vacuum, a droplet size of liquid crystal material is placed at the fill port 115, and with the release of the vacuum, equilibrium pressure forces the liquid crystal material into the fill port 115 and the fill port is plugged. Several techniques to cap the fill port, including UV curable epoxy that may be used to close the fill port.

Thermal Management

Figure 11:
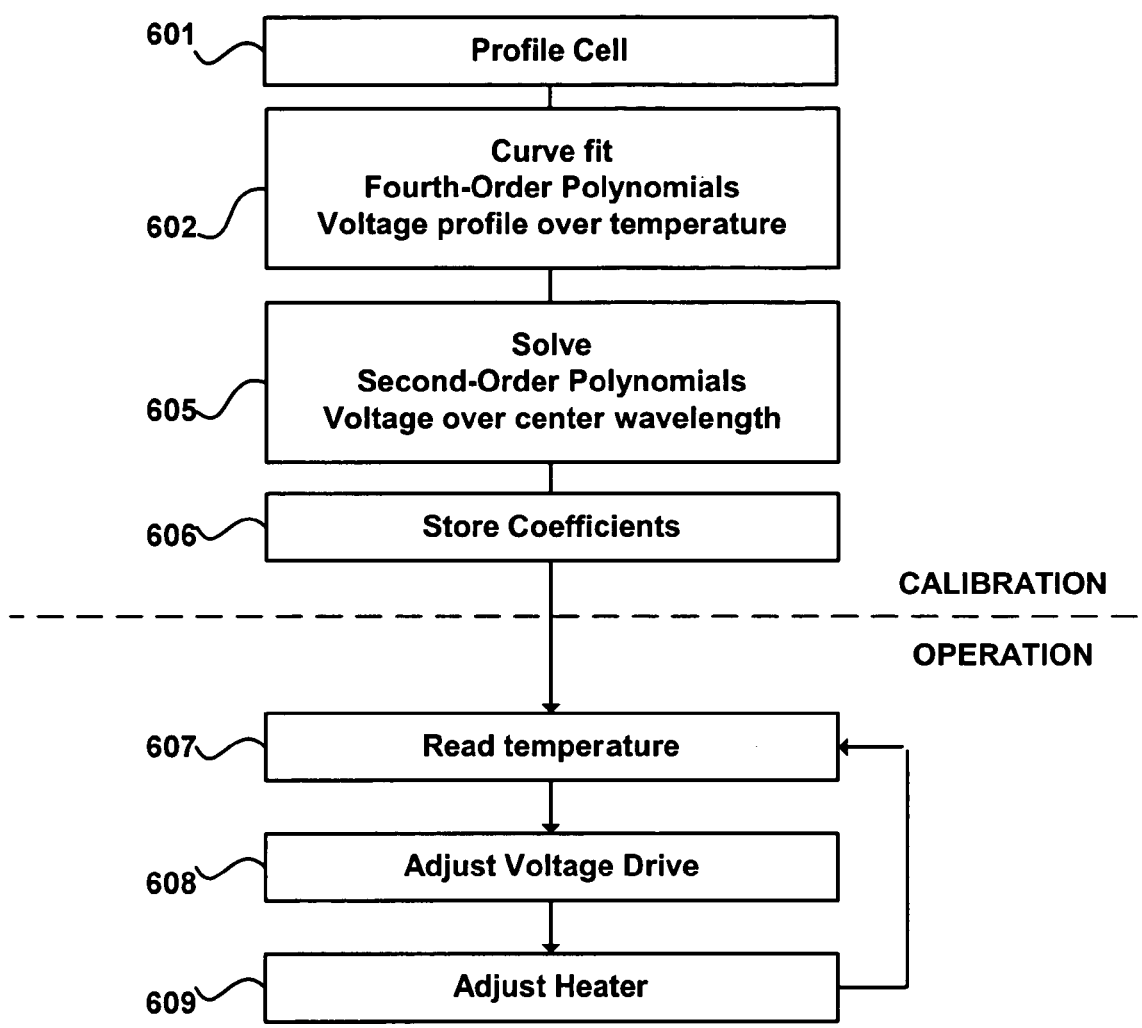
FIG. 11 shows the liquid crystal thermal calibration and feedback loop method flows.
Figure 12:
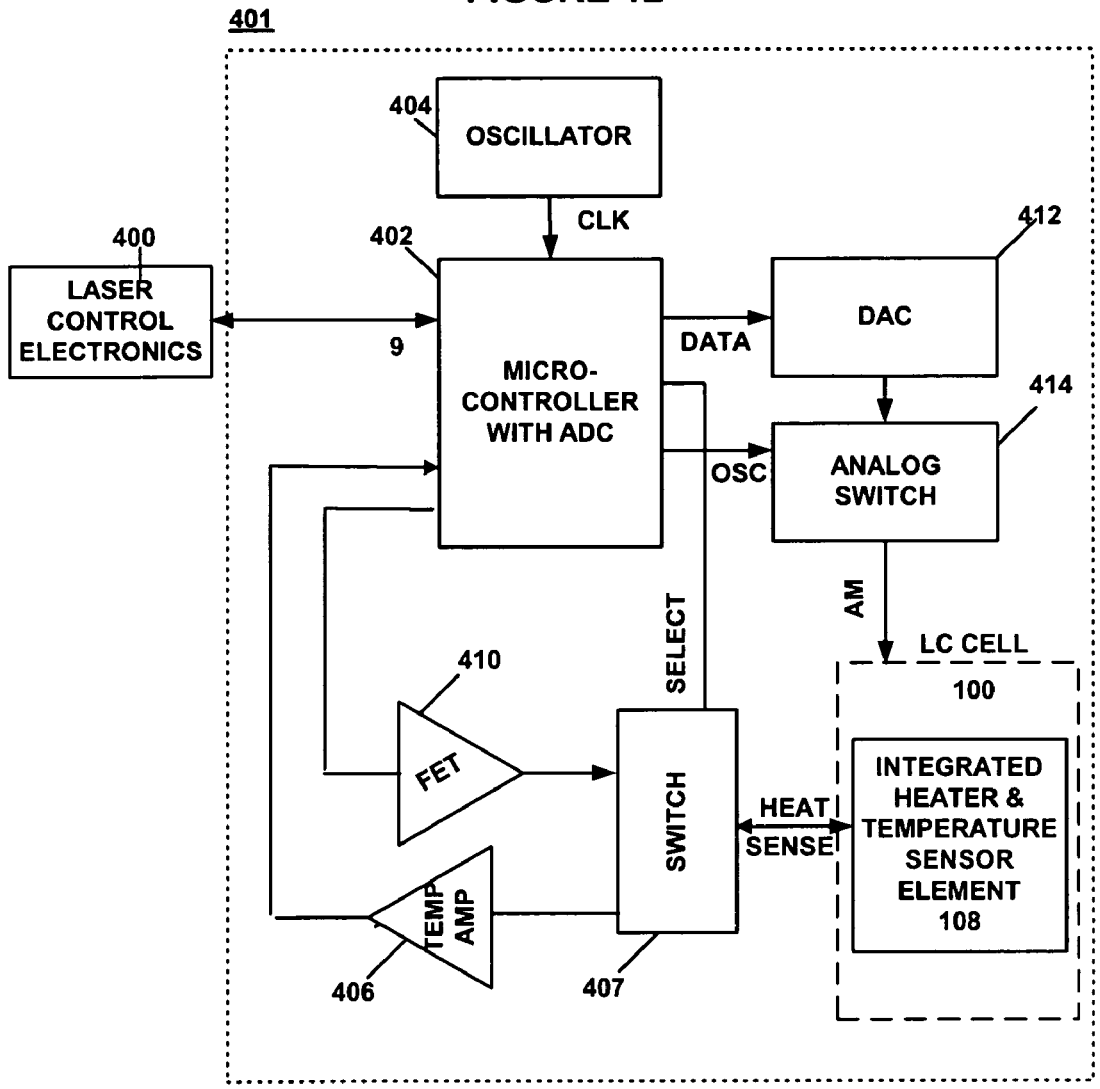
FIG. 12 shows a block system diagram for the electronic control and thermal management system of the present invention.

Any non-linearity in changing the center wavelength of the filter may be algorithmically compensated using a slightly modified thermal calibration and operating processes of the present invention in which a three dimensional curve fit is used to model a parameter space including wavelength versus voltage and temperature. This modification will be evident upon review of the thermal compensation calibration and operating loop now described:

A block diagram of the control system and components directed to a liquid crystal tunable filter are included in FIGS. 11 and 12 along with the liquid crystal thermal management and voltage controller subsystems of the present invention, now described in further detail.

In one example configuration, host computer 400 may be configured to communicate with microcontroller 402 over a full duplex data interface and enabling the host computer to engage functions, send commands and retrieve data from microcontroller 402. Microcontroller may be configured to store software control routines. The software control routines may function to adjust voltage drive provided to each pixel in the liquid crystal cell in response to temperature fluctuations.

The microcontroller may utilize a time division multiplexing scheme that multiplexes temperature sensing and heating functions in the integrated sensor/heater device such that the cell may generally be kept at a constant temperature. Alternately, a calibration process characterizes the profile of the cell and generates a polynomial regression formula that provides the optimal voltage drive output for given temperature and target wavelength inputs. The microcontroller 402 stores the target wavelength of the liquid crystal cell, the regression formula, and reads the temperature of the liquid crystal cell to compute and assert the temperature compensated voltage drive.

FIG. 11 shows a calibration process that may be used to perform the method of the present invention in which a liquid crystal cell thermal operating characteristic profile is translated into deterministic coefficients assembled into a stored regression formula used to adjust the voltage drive to the cell in response to temperature and target wavelength.

The first step to determine the coefficient values in the cell's temperature and voltage compensation profile, is to profile the liquid crystal cell drive characteristics across a range of temperatures. The profile process step 601 may examine a light source passing through the cell and its center wavelength at a given voltage and temperature combination. An operational liquid crystal cell is placed in a thermal chamber programmed to change operating temperature across the desired temperature range at a given interval. At every temperature change interval, a range of voltages are provided to the liquid crystal cell while a performance characteristic, such as center wavelength, is measured. Voltage is scanned until to achieve maximum spectra range, at which point the voltage, center wavelength and temperature levels are stored as a grid reference in a cell profile definition table. The liquid crystal cell center wavelength is recorded at grid points characterized by voltage and temperature levels, resulting in a multi dimensional lookup table whereby any temperature and voltage input provides an center wavelength level output. This table may be represented as a three dimensional surface.

The second step requires processing the lookup table to smooth the voltage profile over temperature at the given center wavelength levels as recorded in the previous step. A statistical program capable of performing regression analysis, such as Mathematica® may be used to perform this process step 602. The regression software is provided with the look up table generated in step one, and performs a fourth order regression curve fitting process that generates for each center wavelength level, the appropriate coefficients a, b, c, d, and e representing a voltage versus temperature profile of the cell at each center wavelength level, represented by the following formula, $$v = a + bT + cT^2 + dT^3 + eT^4$$
$$v_1 = a_1 + b_1 T + c_1 T^2 + d_1 T^3 + e_1 T^4$$
$$v_2 = a_2 + b_2 T + c_2 T^2 + d_2 T^3 + e_2 T^4$$
$$\vdots$$
$$v_n = a_n + b_n T + c_n T^2 + d_n T^3 + e_n T^4$$

where V=voltage, T=liquid crystal cell temperature, a, b, c, d, e=curve fit coefficients, and n=target wavelength.

Given that smooth set of curves resulting from the prior step that define the optimal voltage drive level for a given temperature at the recorded grid center wavelength level, step three results in smooth curve regressions fit across orthogonal axis of the three dimensional surface, whereby the smooth curves are fit over the coarse center wavelength grid recorded in step 1. In this third process step 603, the five coefficients of the previous step are each solved by a second order regression. Specifically, Mathematica® or any suitable program is used to solve for the three coefficients that fit the profile of each of the five coefficients a, b, c, d and e across all of the orders of the regression $v_n = a_n + b_n T + c_n T^2 + d_n T^3 + e_n T^4$. So, a smooth surface profile defines the optimum voltage compensation level given an input target wavelength state and temperature by the following formula:

$v = a + bT + cT^2 + dT^3 + eT^4$, where, a=$(X+Y\theta+Z\theta^2)$
b=$(X_1+Y_1\theta+Z_1\theta^2)$
c=$(X_2+Y_2\theta+Z_2\theta^2)$
d=$(X_3+Y_3\theta+Z_3\theta^2)$
e=$(X_4+Y_4\theta+Z_4\theta^2)$
Theta=liquid crystal center wavelength
X, Y, Z=solution to zero order coefficient
$X_1$, $Y_1$, $Z_1$=solutions to first order coefficient
$X_2$, $Y_2$, $Z_2$=solutions to second order coefficient
$X_3$, $Y_3$, $Z_3$=solutions to third order coefficient
$X_4$, $Y_4$, $Z_4$=solutions to fourth order coefficient The fifteen coefficient solutions (Xn, Yn, Zn) where n=0 to 4, may be generated by Mathematica, using the Fit(data, {1, x, x^2, ..., x^n}, x) function or other suitable software packages capable of performing curve fitting regression.

Step four is the final step in the calibration process of FIG. 11, process 606, and results in storing the coefficients in the liquid crystal control system which is now described.

The coefficients that profile the liquid crystal characteristics may be stored in microcontroller 402 memory (FIG. 12) by flashing the memory of the microcontroller with the appropriate 15 coefficient values.

The thermal compensation system of the present invention operates by reading the temperature of the liquid crystal cell and adjusting the voltage drive of the cell based on the target wavelength. The target wavelength may typically be at any center wavelength in the spectral range. The target wavelength may be stored in the microcontroller 402 and also be configured via the laser control electronics 400.

Microcontroller may be a PIC microchip having an internal analog digital converter and operating with a 10 Mhz crystal oscillator 404 clock. The microcontroller may be programmed to cycle through all pixels in the cell to controllably apply voltage to each pixel. The microcontroller may be connected to a multi-channel digital analog converter (DAC) configured to provide an output voltage level in response to a configuration pulse stream from the microcontroller over a serial interface. The output of the DAC connects to the input of an analog switch array having switching element 414$^n$ associated with each pixel in the cell. Each element in the switch array 414 preferably shares a 1.2 khz clock provided by an output port pin of the microcontroller.

Other drive frequencies may be used to actuate the liquid crystal material. In addition, A frequency modulated drive may be incorporated into the platform to replace the amplitude modulated voltage drive. Such FM drive may also be optimized using the same methodology as described later in the thermal compensation calibration and operation loops.

With respect to the continuing example and for any given pixel, DATA is passed to the DAC along with a SELECT pulse train encoding the appropriate voltage amplitude at the Nth output channel. A WR command sent to the DAC causes the DAC output to be received at the input of the Nth analog switch 414$^n$, triggering the application of an AM transmission over a 1.2 khz carrier to be applied to the appropriate liquid crystal cell electrode 500$^N$. As the microcontroller cycles through each iteration of the process steps described above, N is incremented and the voltage is applied the next pixel in the system.

A temperature sensor reading may be provided by the internal integrated heater/temperature sensor from an external device. One of the heater/temperature sensor electrodes 502 or 502' of the liquid crystal cell 100 may be grounded while the other may connect to switch 407. Switch 407 may selectively engage the integrated heater/temperature sensor element 108 in a sense or heat mode. More specifically, switch 407 may be configured ON to connect the ungrounded heater/temperature electrode through instrumentation amplifier 406 to an ADC coupled to the microcontroller which reads the temperature on the liquid crystal cell, or it may be configured OFF so that power amplifier FET 410, which may be controlled by a pulse train from microcontroller 402 and applies a voltage potential to operate the device 108 as a heater.

In a temperature sense feedback closed loop operation, which shall hereby be referred to as the loop embraced by process steps 607 through 609 of FIG. 11, the microcontroller reads the temperature of the liquid crystal cell and calculates the voltage drive based on the sensed temperature, T, and the current state of each pixel, Theta. The fifteen coefficients are plugged back into the fourth order regression formula to establish a smooth surface profile delineating an optimal voltage to supply to the pixel for a given temperature and pixel center wavelength:

$v = (X + Y\theta + Z\theta^2) +$ $(X_1 + Y_1\theta + Z_1\theta^2)T +$ $(X_2 + Y_2\theta + Z_2\theta^2)T^2 +$ $(X_3 + Y_3\theta + Z_3\theta^2)T^3 +$ $(X_4 + Y_4\theta + Z_4\theta^2)T^4$ The new voltage value V. is stored in the microcontroller for transmission to the DAC 412 during the next voltage application cycle.

The liquid crystal cell may also be maintained about a reference temperature. Process step 609 with respect to FIG. 11 involves the application of heat to maintain the temperature of the liquid crystal cell about a reference temperature. The reference temperature may be above the ambient room temperature or above the temperature of any carrier device that may be coupled to the liquid crystal cell. The selection of a reference temperature above the ambient temperature will result in the tendency of the liquid crystal cell to cool to meet the ambient temperature after the application of a heat burst. A counter thermal bias is therefore generated to support temperature stability about the reference temperature.

Microcontroller memory may store the reference temperature, the value of the current temperature, historical temperatures, and, historical levels of heat applied to the liquid crystal cell. The value of the sensed temperature T at every instance may be compared against the reference temperature to determine the amount of heat to apply to the liquid crystal cell. An 8 bit analog digital converter will provide approximately ⅓ of a degree of temperature sensing resolution over the desired temperature range, so the example system may provide for temperature stability about a reference temperature to within ⅓ degree Celsius. At every instance of process step 609, a threshold detector routine stored in microcontroller ROM may trigger a control function if the sensed temperature of the liquid crystal cell falls below the desired operating reference temperature. The control function may determine how much heat to apply to the liquid crystal cell. The control function may utilize error minimizing routines that track the change in temperature across multiple instances of process step 609. The error correcting routines may store the previous temperature reading T0 along with the previous amount of heat applied to the liquid crystal cell H0. The temperature reading and every succeeding temperature reading T1 may be compared against T0 to determine the amount of temperature change resulting from the previous heating of the liquid crystal cell. Heat may be applied to the liquid crystal cell by way of the FET power driver as described above. The heater may be triggered at a fixed or variable duty cycle and controlled using frequency or amplitude modulation. The temperature may be controlled at max operating temperature, otherwise it could be controlled at some temperature greater than ambient but less than maximum. In this case, the integrated heater may be used in conjunction with the preceding calibration method but with a limited temperature range.

Although the present invention has been fully described by way of description and accompanying drawings, it should be understood that any tunable filter may be used in the wavelocker of the present invention provided a means for capturing the passband and compliment transmission signal is included in the wavelocker, and that the liquid crystal tunable filter described herein in enabling detail is only provided to demonstrate one known tunable filter having such means for capturing the passband and compliment transmission signals (ie. By way of integrated photodetectors). It is not necessary but preferred to use the same material deposition for the solder dam 107A as used in the spacer element 107B but the solder dam shall not be part of any definition of a spacer element; the two were referred to herein under common reference 107 only because the example tunable filter described was a preferred embodiment that used the same material for each feature. All of the thin film layers may be substituted with an equivalent or compatible material. Any thin film deposition having thickness greater than 1 micron may be comprised of multiple alternating materials to form a neutral stress stack. For example, other materials that provide adhesion layers, oxidation reduction, electrolyte barriers, etc., may be used as one skilled in the art would be capable of applying. As so, various changes and modifications to the present invention will be apparent to those skilled in the art. For example, in some configurations, it is not essential that the microcontroller include an integrated ADC as an external ADC may be coupled to a microcontroller or the same functionality can be achieved using analog electronic components. The linear feedback output 9 may be established without the use of a microcontroller altogether. A comparator circuit could be used to process the output of the reflected passband 127 and the transmitted output 128 power intensities into a feedback signal 9. The feedback signal 9 may be analog or digital. Other points on the side of the tunable filter transmission peak may be used other than the 50% point where the passband and filter output cross. It is within the scope of the invention to use a liquid crystal tunable filter in the present wavelocker invention, wherein, for example, the liquid crystal tunable filter includes a seal other than the metal gasket i.e. a glass or glass frit gasket or gasket made via glass etching, epoxy or other suitable material or combination of material as one skilled in the art of liquid crystal would be capable of developing the present invention using an epoxy or other known liquid crystal seal. The metal gasket of the present invention may be assembled using a process other than thin film coating, such as photolithography with metal plating, etching, nanoimprint lithography. With regarding to control, amplitude or frequency modulation may be used to tune the liquid crystal tunable filter. Therefore, it is to be noted that various changes and modifications from those abstractions defined herein, unless otherwise stated or departing from the scope of the present invention, should be construed as being included therein and captured hereunder with respect to the claims.

The invention claimed is:

1. A wavelength locker system, comprising:
   an optical tap placed in the optical path of a laser transmitter for splitting a laser signal into a tapped signal and a laser output signal,
   a free space tunable filter accepting the tapped signal and producing two signals that add to form a representation of the tapped signal,
   photodetectors coupled to the tunable filter, said photodetectors being configured to capture each of said signals output from said tunable filter and to produce two electrical signals that represent the power intensity of each of said two signals output from the tunable filter, and
   an electronics unit configured to accept the two electrical signals produced by the photodetectors and to generate a feedback signal in response thereto.

2. The wavelength locker system of claim 1, wherein the photodetector means are integrated onto the tunable filter.

3. The wavelength locker system of claim 1, wherein the tunable filter is a liquid crystal tunable filter.

4. The wavelength locker of claim 3, wherein the tunable filter is a bandpass filter and where the two signals produced thereby include a reflected signal and a transmitted signal.

5. The wavelength locker of claim 3, wherein the liquid crystal tunable filter is a tunable etalon.

6. The wavelength locker of claim 1, wherein the electronics unit is a microcontroller.

7. The wavelength locker of claim 6, wherein the microcontroller also monitors the thermal environment of the tunable filter.

8. The wavelength locker of claim 7, wherein the microcontroller controls tuning of the tunable filter.

9. The wavelength locker of claim 1, wherein the tunable filter is tuned to an offset of a target lasing frequency at a 50% power transmission.

10. A wavelength locker system, comprising;
    an optical tap placed in the optical path of a laser transmitter for splitting a laser signal into a tapped signal and laser output signal,
    a tunable filter accepting the tapped signal and producing two electrical signals that add to form a representation of the tapped signal, said filter tuned at an offset from a target lasing frequency at a point in which the two electrical signals output from the tunable filter intersect to form a lock point, and
    an electronics unit configured to generate a feedback signal in response to the two electrical signals output from the liquid crystal.

11. The wavelength locker of claim 10, wherein the feedback signal is coupled to the laser to form a feedback loop.

12. The wavelength locker of claim 10, wherein the feedback signal describes the direction and magnitude difference between the lock point and laser output signal.

13. The wavelength locker of claim 10, wherein the tunable filter is a liquid crystal device.

14. The wavelength locker of claim 13, wherein the liquid crystal device includes an integrated temperature sensor.

15. The wavelength locker of claim 13, wherein the liquid crystal device includes a metal seal.

16. The wavelength locker of claim 13, wherein the liquid crystal device includes an epoxy seal.

17. The wavelength locker of claim 15, wherein the metal gasket surrounds an aperture of the liquid crystal device.

18. The wavelength locker of claim 10, wherein the liquid crystal device includes a control system for maintaining the device operation at various temperatures.

19. A method of wavelength locking, including the steps of:
    a. Providing a tunable filter that produces reflected and complimentary transmitted signal outputs,
    b. Reading the temperature of the tunable filter,
    c. Adjusting the tunable filter,
    d. Measuring the outputs of the tunable filter, and
    e. Generating a wavelength locker feedback signal response to the information collected in step d.

20. The method of claim 19, wherein step e includes a division operation.

* * * * *